(12) United States Patent
Munroe et al.

(10) Patent No.: US 6,298,428 B1
(45) Date of Patent: Oct. 2, 2001

(54) METHOD AND APPARATUS FOR SHARED PERSISTENT VIRTUAL STORAGE ON EXISTING OPERATING SYSTEMS

(75) Inventors: Steven Jay Munroe; John Gerard Nistler; James W. Stopyro, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/050,830

(22) Filed: Mar. 30, 1998

(51) Int. Cl.[7] .............................. G06F 12/00; G06F 7/00; G06F 17/00; G06F 15/167
(52) U.S. Cl. ...................... 711/202; 711/203; 711/200; 707/103; 707/100; 707/104; 709/213
(58) Field of Search ...................................... 707/103, 100, 707/104; 711/118, 133, 134, 142, 143, 200, 147, 203, 202; 709/213

(56) References Cited

U.S. PATENT DOCUMENTS

| | | | |
|---|---|---|---|
| 4,638,426 | * 1/1987 | Chang et al. | 364/200 |
| 5,437,027 | * 7/1995 | Bannon et al. | 395/600 |
| 5,761,696 | * 6/1998 | Giordano et al. | 711/6 |
| 5,953,520 | * 9/1999 | Mallick | 395/568 |
| 5,987,506 | * 11/1999 | Carter et al. | 709/213 |
| 6,003,123 | * 12/1999 | Carter et al. | 711/207 |
| 6,016,495 | * 1/2000 | McKeehan et al. | 707/103 |

OTHER PUBLICATIONS

Webopedia (http://webopedia.internet.com/TERM/v/virtual¯memory.html), Sep. 1996.*
Amaral, IEEE, "A Model for Persistent Shared Memory Addressing in Distributed Systems", Dec. 1992.*
Microsoft, "Managing Virtual Memory in Win32", Sep. 1996.*

* cited by examiner

Primary Examiner—Do Hyun Yoo
Assistant Examiner—Kimberly McLean
(74) Attorney, Agent, or Firm—S. Jared Pitts; Schmeiser, Olsen & Watts LLP

(57) ABSTRACT

The preferred embodiment present invention provides a shared persistent virtual storage system and method for creating and managing a large logical virtual address space, called a shared address space (SAS), on existing systems. The shared persistent virtual storage system provides an interface layer between client processes using the SAS addresses and the underlying system. By providing the ability to use a large shared address space, the preferred embodiment allows the creation and sharing of persistent objects using single level store semantics. The preferred embodiment does this by mapping the shared address space to backing store as needed, and by implicitly moving portions of data, called pages, between backing storage and main memory as needed by client process. The preferred embodiment then provides a mechanism for translating shared address space addresses into a native address of the data in the page cache and providing that address to the application. Thus, the preferred embodiment provides the ability to store data using proven single level storage techniques in commodity systems that use smaller native addressing. This data can then be easily shared between client processes using the shared address space addresses.

58 Claims, 5 Drawing Sheets

METHOD AND APPARATUS FOR SHARED PERSISTENT VIRTUAL STORAGE ON EXISTING OPERATING SYSTEMS

RELATED APPLICATIONS

This application is related to the following U.S. patent applications: "Shared Persistent Objects", Ser. No. 09/050,821, filed on Mar. 30, 1998; "Virtual Machine Implementation for Shared Persistent objects", Ser. No. 09/050,832, filed on Mar. 30, 1998; and "Method and Apparatus for Encapsulating Address Translation for Shared Persistent Virtual Storage", Ser. No. 09/050,831, filed on Mar. 30, 1998, that are hereby incorporated by reference.

BACKGROUND OF THE INVENTION

1. Technical Field

This invention generally relates to virtual storage and more specifically relates to a method and apparatus for providing shared persistent virtual storage on 32 bit operating systems.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

Computer systems typically include operating system software that controls the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Object-oriented programming based on an object model is a new way of creating computer programs that has become very popular over the past several years. The goal of using object-oriented programming is to create small, reusable sections of program code known as objects that can be quickly and easily combined and re-used to create new programs. By creating and re-using a group of well-tested objects, a more stable, uniform, and consistent approach to developing new computer programs can be achieved.

One issue in object oriented programming is object persistence. Typically, when a process ends, all of the references to objects created by the process are lost, and the objects themselves are destroyed. These objects are referred to as transient objects. Persistent objects, as opposed to transient objects, have a lifetime that transcends the lifetime of the process that created them. To make an object persistent, mechanisms must be put in place to allow a persistent object to survive beyond the lifetime of the process from which the object was created so that other processes can access the object. This typically involves the storing of the objects onto permanent storage devices, such as hard disks, optical disks, tape drives, etc.

Many common computer systems use an addressing scheme referred to as the two level storage (TLS) model. The TLS model stores and manipulates data using two systems: a file manager and a virtual memory system. The virtual memory includes the actual memory and a specialized data file called a swap file. The virtual memory system controls the allocation of address space to different processes. The file manager stores and retrieves data from the permanent storage devices in the form of files.

One benefit to using the TLS model is that it provides large amounts of address space to fixed size address machines. This large address space is useful for storing large amounts of information. However, the TLS models does not provide a way for storing persistent objects in a way that can be efficiently used by a computer system.

In particular, in a TLS system persistent data, such as persistent objects, must be stored in files on a disk or other storage medium by the file manager. When a process needs to access a persistent object, the process must contact the file manager which locates the persistent object in a file on backing store and move a copy of the persistent object data into a memory buffer. The persistent object data must then be reconstructed into a persistent object in memory.

When the data being stored by the TLS model is persistent, several problems are introduced. For example, persistent objects typically contain many pointers used for sharing data and methods with other objects. When a persistent object is retrieved from backing store and a new runtime representation of the object is created, any internal pointers contained within the persistent object must be converted and rebuilt. Rebuilding persistent objects, and more specifically, converting pointer references contained within persistent objects results in significant overhead on the CPU.

Some TLS systems use externalization techniques to store persistent objects. These techniques pull data from the object and write the externalized data to a data file. When the object is needed again, the data must be read in by the file system and the persistent object recreated using state data. This processes requires reading from the file system to a memory buffer, and copying data from the memory buffer to the object. This also creates significant unwanted CPU overhead.

Another addressing scheme is the single level storage (SLS) model. The SLS system maps all of the storage mediums, including persistent storage mediums such as hard drives, into a single address space. This makes the entire data storage system into a single "virtual memory" that is accessed directly using a single, process independent, address space. In an SLS system, persistent data from the permanent storage mediums can be easily copied to real memory using the virtual memory addressing.

The SLS model is a very efficient means of making and manipulating persistent objects because it reduces the amount of system overhead to load persistent objects into memory. As mentioned, when a process needs a persistent object, the persistent object is copied from persistent storage and into real memory. This involves creating only one copy rather than the two copies created by the TLS model. Because pointer references are processes independent, SLS system allows persistent objects, including pointer references contained within persistent objects, to be moved into and from persistent storage without requiring any rebuilding of the persistent object. When a process needs to access a persistent object, the SLS model simply moves this object from the backing store into memory. Stated another way, the SLS model eliminates the need to create a runtime representation of a persistent object since pointer references contained within the persistent object always remain valid. Another advantage to SLS systems is that pointers to objects are process independent. This allows easy sharing of persistent objects between multiple processes.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity 32-bit systems continue to have no easy way to provide object persistence.

Without a more effective method for providing persistent storage to 32 bit address systems, the computer industry will never fully realize the benefits of object oriented programming.

SUMMARY OF THE INVENTION

The present invention provides a shared persistent virtual storage system and method for creating and managing a large logical virtual address space, called a shared address space (SAS), on existing systems. The shared persistent virtual storage system provides an interface layer between client processes using the SAS addresses and the underlying system. By providing the ability to use a large shared address space, the preferred embodiment allows the creation and sharing of persistent objects using single level store semantics. The preferred embodiment does this by mapping the shared address space to backing store as needed, and by implicitly moving portions of data, called pages, between backing storage and main memory as needed by client process. The preferred embodiment then provides a mechanism for translating shared address space addresses into a native address of the data in the page cache and providing that address to the application. Thus, the preferred embodiment provides the ability to store data using proven single level storage techniques in commodity systems that use smaller native addressing. This data can then be easily shared between client processes using the shared address space addresses.

The foregoing and other features and advantages of the present invention will be apparent from the following more particular description of the preferred embodiment of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

Figure 1:
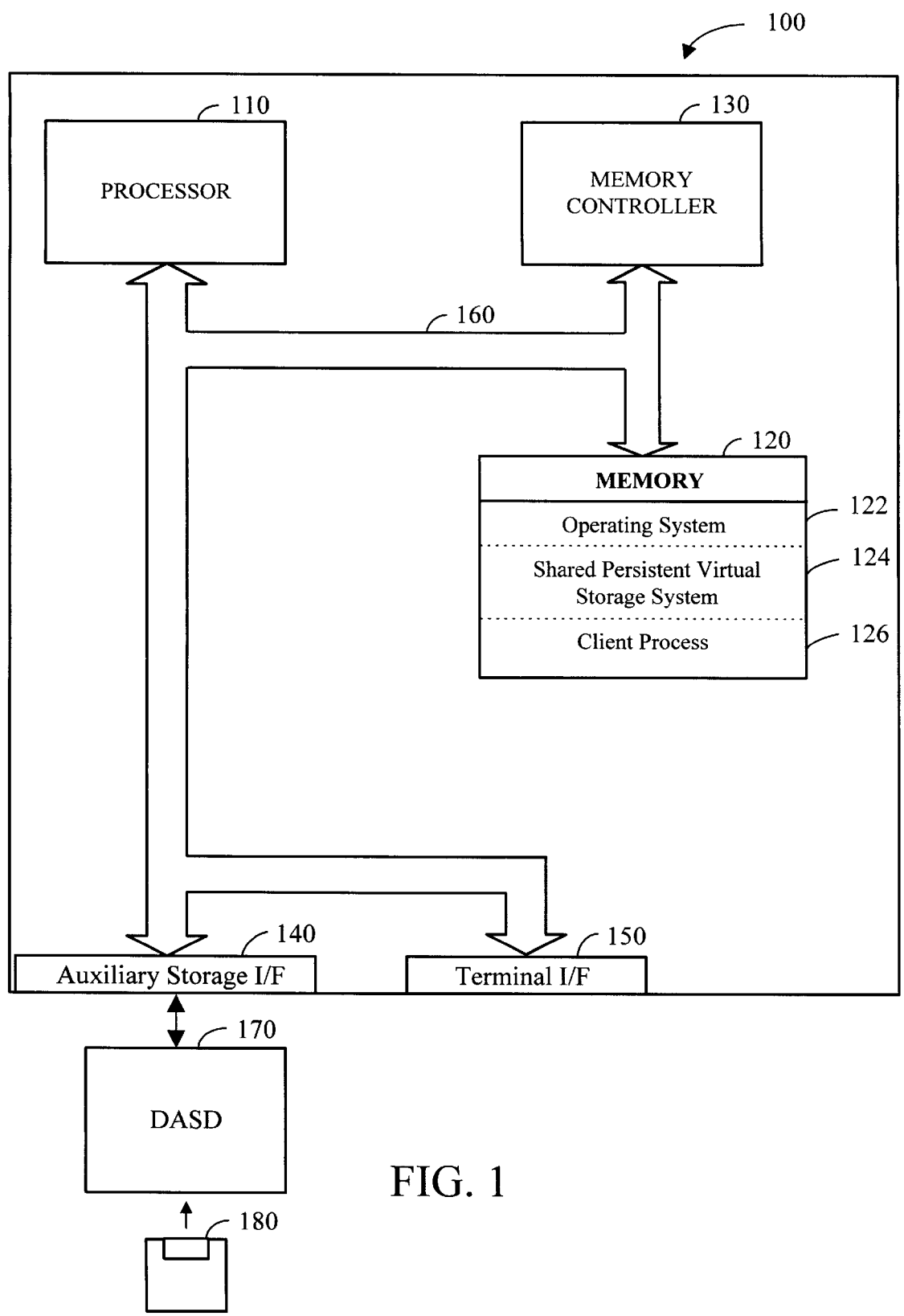
FIG. 1 is a block diagram of a computer system in accordance with a preferred embodiment of the present invention.

The present invention relates in general to object-oriented programming techniques. For those individuals who are not generally familiar with object-oriented programming, single level storage (SLS) and two level storage (TLS) models, the Overview section below presents many of the basic concepts and terminology that will help to understand the invention. Individuals skilled in the art of object-oriented programming may wish to skip this section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

There are many computer languages available today that support object-oriented programming. For example, Smalltalk, Object Pascal, C++ and JAVA are all examples of languages that support object-oriented programming to one degree or another.

One issue in object oriented programming is object persistence. Persistent objects, as opposed to transient objects, have a lifetime that transcends the lifetime of the program that created them. To make an object persistent, mechanisms must be put in place to allow the object to survive the process that creates it so it can be accessed by other processes.

One common approach to providing persistence is the use of a use a persistent mixin class of objects. In this approach all objects for which persistence is desired must have this persistent mixin class as a superclass somewhere in their class's inheritance lattice. Because a mixin class is required in the inheritance lattice, this method of providing object persistence cannot be used to provide persistence in a way that is orthogonal (i.e., independent) to the class of the object. Because the object persistence is not orthogonal to class, the applications in which it can be used are limited.

Another approach which provides object persistence is "externalization". Externalization is the means or protocol used in object-oriented programming for transferring data out of an object. In essence the "state data" that defines the attributes of an object are "externalized", or written out of the object, into a different format that is easily stored in the local data store. When the object is needed again, the externalized state data is internalized into an object, creating an exact copy of the object as it previously existed. Additionally, any pointers in the persistent objects must be accounted for during externalization. This requires converting the pointer to an object "name" for storage, and then turning it back when the externalized object is recreated. All these process required for externalizing the state data for storage, dealing with internal pointers, and then internalizing it again when needed takes an excessive amount of processing time and thus slows performance in a way that can be unacceptable in many applications.

When persistence of an object is independent of its class or type, the persistence is said to be orthogonal to class. With an orthogonal persistence system, any object of any class can be made persistent. Thus, no special "persistence object base class" with special methods is required to be in the objects superclass lattice for the object to be persistent. Furthermore, all the procedures and methods defined by the superclass lattice are available on each object regardless of whether that object is persistent or transient.

Memory and File Systems

Modern computers use a variety of methods to manage, access and store data in computer systems. Computer systems typically contain two main types of data storage, transient data storage such as DRAM, and persistent storage such as hard disk drives, optical drives and such. Several systems exist for managing the flow of information between these storage mediums and the processors that execute the programs.

Most commodity computer systems today, such as IBM compatible personal computers running IBM's OS/2 or Microsoft's Windows, use a system called two-level store (TLS). TLS systems use a file system for storing data on permanent storage and a virtual memory system for running application processes. Included in the virtual memory system of TLS systems is a specialized data file called a swap file. The swap file is used as "extra memory" to store data for application processes that are too large to be loaded into the limited amount of "real memory".

In TLS systems a file manager keeps a directory that relates the name of a file to the location on the disk where the data for the file is stored. The file manager provides an interface to allow programs to "read" a file. The data from the file is then copied into memory, which include the real memory and the swap file. There, the data can be used and manipulated. When the program is finished with the data, a "write" operation is performed, which causes the data to be moved from the virtual memory back to the file on the disk.

In most TLS virtual memory systems, each application process is assigned its own virtual address space. For example, when the central computer creates a first process, the underlying operating system allocates a virtual address space for use by this process only. As the process executes the operating system will allocate real memory chunks for usage by the process. As each real chunk is allocated, the operating system will also create a mapping of the process virtual addresses to real memory. This procedure would be repeated for other application processes running on the same computer. As the real memory becomes overcommited, the contents of the real memory can be temporarily moved to the swap file and the real memory portion reused by other processes.

When an application processes is started, the data for the application must first be moved from its permanent storage file to the virtual memory system. This typically involves copying a portion of the application into real memory and a portion of the application into the swap file. The application then runs from the real memory, using its virtual addressing while the operating system moves portions of the application between real memory and the swap file as needed.

This system does have its advantages. For example, because the operating system hides the complexity of real memory system and swap file from the application, it is easier to write applications. Second, it isolates each process from all others so that bugs in one processes do not usually cause bugs in other processes.

The system unfortunately also has several disadvantages. One of these is the context dependent nature of the virtual addresses. Because each application uses a virtual address range that has no meaning to other applications, addresses cannot be easily shared between applications. For example, only the first application process could access its allocated chunk of memory, but cannot access data in a second chunk of memory which belongs to the second process.

This context dependency is especially troubling for persistent objects, which by definition can outlive the application processes which created them. Persistent objects typically contain address pointers which reference valid information when created. However, as mentioned, the TLS model creates memory for each process and destroys the memory when the process is eliminated. Therefore, when a persistent object is created, the pointers contained within the object remain valid only as long as the application which created the persistent object is in memory. Once the persistent object is saved onto backing store, the meaning of the pointers within the object are lost.

In order to avoid this problem, externalization techniques are required to convert the pointer to an object "name" when storing the persistent object. When the persistent object is retrieved from backing store and a new runtime representation of the object is created, the object name must be converted to a new valid pointer. This process of creating a new runtime copy of the persistent objects and converting pointer references contained within persistent objects results in significant overhead on the CPU.

The single level storage (SLS) model was developed in response to the memory management problems described above. The SLS system maps all of the data storage mediums, generically referred to as backing store, into a single large address space. The backing store can include any type of local storage medium, such as magnetic and optical disk drives, and can also include the storage mediums of multiple computer systems connected by large networks. In the SLS model each byte of data contained within this large backing store area is addressed using its own unique, context independent virtual address. This makes the entire storage system function as a single "virtual memory" with a context independent addressing scheme.

The SLS model is very efficient means of making and manipulating persistent objects because it reduces the amount of system overhead to store and retrieve persistent objects from backing store. In an SLS system, persistent objects, including pointers to other objects contained within the persistent object, can be stored in backing store without modification.

This is allowed because pointers stored in persistent objects in an SLS system are context independent. Because all applications share the same large virtual address space, all pointers to objects remain valid regardless of their context. This eliminates the need for converting pointer references to "names" when storing persistent objects.

Thus, no separate steps are required to store persistent objects to backing store, such as those required to externalize object data in TLS systems. Likewise, no separate steps are needed to retrieve persistent objects from backing store. When a persistent object is needed from backing store, the persistent object can be simply copied from backing store into a memory buffer, with no recreation required. Thus, SLS systems eliminate the need to create different runtime and storage versions of persistent objects. Because persistent objects can be simply copied from backing store to/from memory as needed, processor overhead in dealing with persistent objects is significantly reduced.

Furthermore, because all address pointers are context independent, they can be easily shared between processes. In contrast, the context dependent pointers of TLS are valid only in the processes that created them and cannot be shared without some difficultly.

The SLS model has been successfully implemented using 48 and 64 bit memory addresses since 1980 (IBM System/38 and AS/400). However, many business applications today run on desktop PC's which have 32 bit memory addresses. Because a SLS system maps all data storage into a single virtual memory, a very large address space is required. A 32 bit SLS system would simply not be large enough to store the enormous amounts of data generated by large business applications. Thus, programmers and computer users of commodity systems cannot use the SLS model and continue to have no easy way to provide object persistence.

2. Detailed Description

Referring now to FIG. 1, a computer system 100 in accordance with a preferred embodiment of the present invention is a standard IBM compatible computer system. However, those skilled in the art will appreciate that the method and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 126 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a shared persistent virtual storage system 124, and at least one client process 126. It should be understood that for purposes of this application, in memory 120 is used in its broadest sense, and can include Dynamic Random Access Memory (DRAM), Static RAM (SRAM), flash memory, cache memory, etc. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 include any and all forms of computer programs, including source code, intermediate code, machine code, and any other representation of a computer program.

The shared persistent virtual storage system 124 provides a mechanism for creating and managing a large logical virtual address space, called a shared address space (SAS), on existing 32-bit systems. The shared persistent virtual storage system 124 accomplishes this by providing an interface layer between client processes using the SAS addresses and the underlying system. The shared address space provides the ability to create and share persistent objects with single level store semantics. The preferred embodiment does this by mapping the shared address space to backing store as needed, and by implicitly moving portions of SAS data, called pages, between backing storage and main memory as needed by client process. The preferred embodiment then provides a mechanism for translating shared address space addresses into native addresses of the data in the page cache and providing that address to the application. Thus, the preferred embodiment provides the ability to store data using proven single level storage techniques in commodity systems. This data can then be easily shared between client processes using the shared address space addresses.

It should be understood that in this application the term shared address space refers to the large address space that allows applications to store persistent data using single level store semantics. Likewise, the term native address as used in this application refers to an address that can be used by the underlying system to retrieve data from the page cache. As such, the native address is typically a 32 bit virtual address as used in the two level store of the underlying system. Of course, the underlying system is not required to use 32 bit addressing and can instead use any size native addressing.

In the preferred embodiment, the shared address space uses large 128 bit virtual addressing to provide single level storage semantics for two-level store systems. Of course the shared address space is not required to be 128 bits, it can be any size large enough to effectively address the needed data using single level store semantics.

Figure 2:
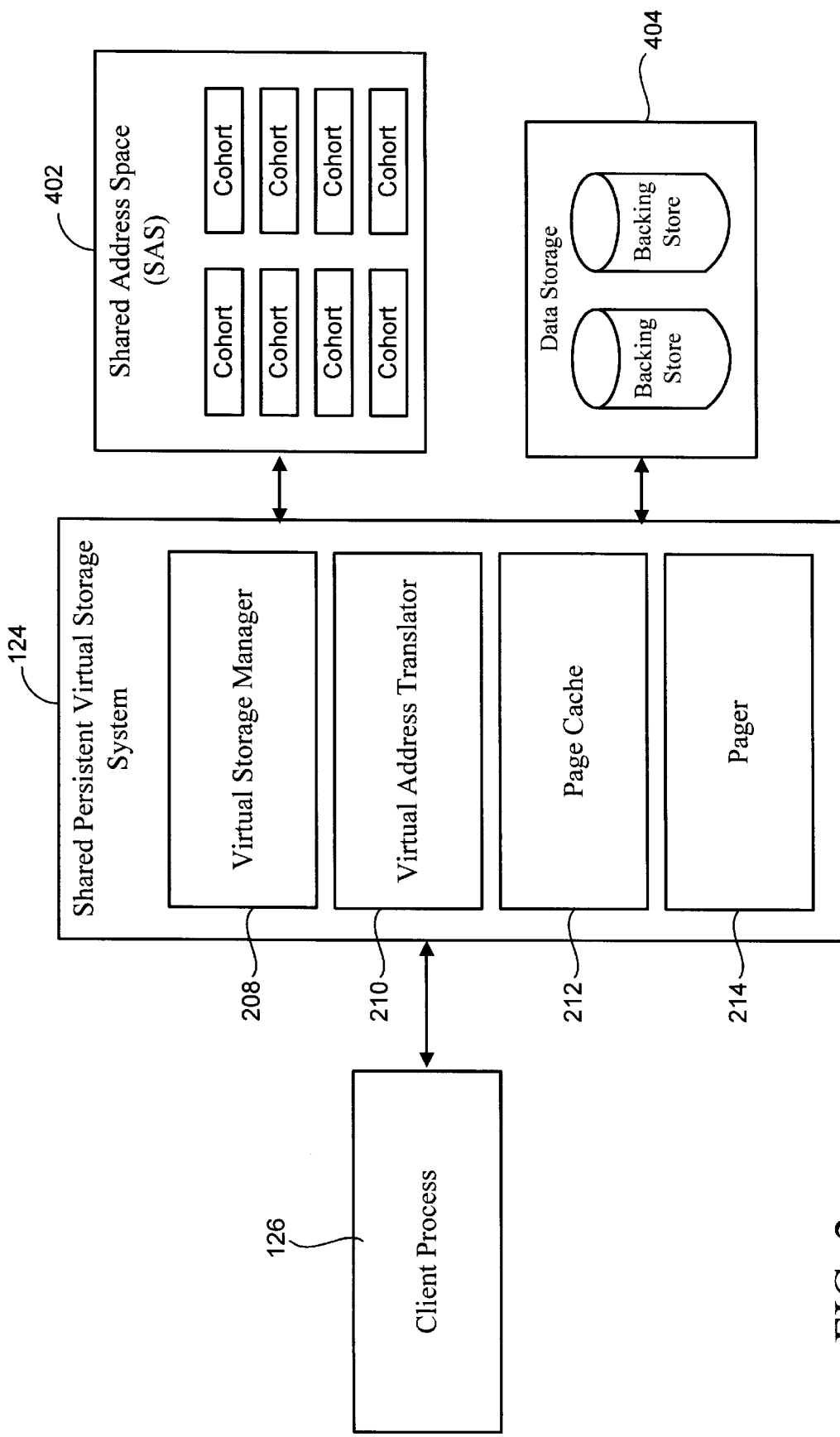
FIG. 2 is a block diagram of a shared persistent virtual storage system in accordance with a preferred embodiment of the present invention.

Referring now to FIG. 2, the preferred embodiment shared persistent virtual storage system 124 and a client process 126 are illustrated schematically. The shared persistent virtual storage system 124 manages a large shared address space (SAS) 402, performs address translations as necessary, and controls the retrieval and storage of SAS data in data storage 404. In accordance with the preferred embodiment, the shared persistent virtual storage system 124 includes a virtual storage manager 208, a virtual address translator 210, a page cache 212, and a pager 214. The virtual storage manager 208 allocates and deallocates portions of the SAS 402 to portions of the data storage 404 as needed. The virtual address translator 210 translates 128 bit SAS addresses to native addresses of the data in the page cache when requested by client processes. The pager 214 moves pages of data between data storage 404 and page cache 212 as needed by client processes.

Figure 3:
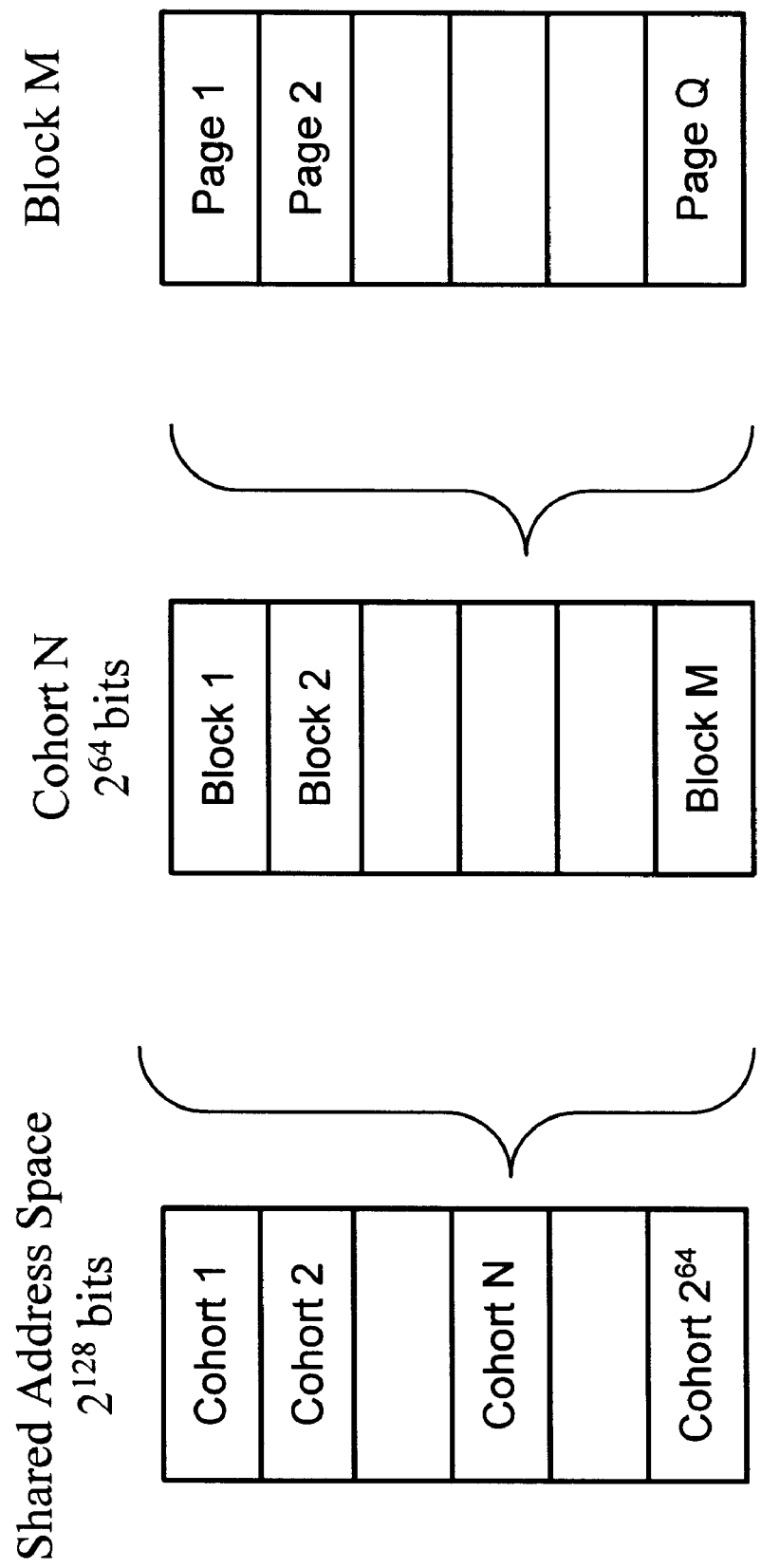
FIG. 3 is a schematic diagram of a shared address space divided into cohorts, blocks and pages in accordance with a preferred embodiment of the present invention.

In the preferred embodiment, the shared address space 402 is segmented into logical subdivisions. These logical subdivisions facilitate administration of the shared address space by allowing different applications to be assigned different portions of the shared address space. Furthermore, these subdivisions facilitate system administration by allowing system administrators to separately define user rights (e.g., who can read objects, who can create objects, who can write objects, who can allocate space) for each subdivision. Turning to FIG. 3, the preferred method for partioning the shared address space is illustrated. In particular, the shared address space is subdivided into a plurality of cohorts. In the preferred embodiment where the shared address space is 128 bits, $2^{64}$ cohorts are created with each cohort preferably comprises a 64 bit portion of that shared address space, with each cohort addressing $2^{64}$ bytes of data. Each cohort is then subdivided into a plurality of blocks. Preferably, these blocks can be sized as needed. Each block is then subdivided into a plurality of pages, with each page preferably comprising a 12 bit portion of the shared address space accessing 4096 bytes of data.

To facilitate management of the shared address space 402, a plurality of data structures are provided by the shared persistent virtual storage system 124. These data structures support the logical partitioning of the shared address space into cohorts and blocks. These data structures would preferably include cohort data structures for each created cohort, and block data structures for each created block in the cohorts. The cohort data structures would preferably include pointers to block data structures which reside in the corresponding cohort. The block data structures would preferably include the information needed to retrieve data in the corresponding block from data storage 404. For example, in one embodiment each block containing persistent data is stored as a separate file in the file system of data storage 404. In this case, each block data structure would include the name of the file in which the corresponding block is located. When the pager 214 needs to retrieve a page of persistent data from backing store 404 it retrieves the name of the file containing the page from the corresponding block data structure. The shared persistent storage system 124 can then request the required data from the data storage 404 file system using that file name. It should be noted that the preferred embodiment can be adapted to work with any type of data storage system and their associated file systems.

To work with these data structures, the preferred embodiment shared persistent virtual storage system 124 includes a plurality of functions designed to interact with the data structures and their corresponding portions of the shared address space 404. These functions could be implemented as application program interfaces (API's) or as object methods. The preferred functions would include a SASinfo, CohortCreate, CohortDelete, BlockCreate, BlockDelete, BlockAllocate, BlockDeallocate, BlockInfoById and BlockInfoByName. The SASinfo function returns a list of cohorts that have been created in the shared address space.

The CohortCreate function creates a new cohort in the shared address space, reserving a portion of the shared address space and creating any data structures needed for the new cohort.

The BlockCreate function reserves a subportion of a specified cohort and creates any data structures needed for the block. In the preferred embodiment, the caller is allowed to specify a size for that block, which will be rounded to a power of 2. Typically, blocks would be quite large ($2^{24}$ bytes), but could be as small as one page. In the preferred embodiment, the BlockCreate function searches for a free chunk of shared address the appropriate size to reserve. If all the free storage chunks are too big, one selected and broken into smaller blocks until one of the correct size is available.

The BlockAllocate function allocates a number of pages within the specified block, which allows a caller to store data in these pages. It should be noted that it is typically necessary to allocate a page before any access are made to the page. A page which is reserved but not allocated is preferably not accessible to the client process. When pages are allocated, backing store is allocated to store data in that page. This can be done in a variety of ways. For example, it could be mapped directly to backing store. In this case if none of the specified block as been allocated before, a file in the underlying file system is created corresponding to the block. If a some of the block has been previously allocated and a corresponding file for the block has already been created, BlockAllocate can simply add to that file. BlockAllocate uses the semantics of the underlying file system to ensure that the physical space in backing store is allocated. For example, in some file systems it may be necessary to actually write data to the file, while in others moving the end of the file pointer is sufficient.

The BlockDeallocate function frees the specified range of pages within the block. The block data structure is then updated to show these pages as reserved, but not allocated. Backing store for the range of pages being deallocated is then freed up.

The BlockDelete function deallocates all of the currently allocated pages within the block and frees up the corresponding backing store. The cohort data structures are then updated to unreserve the subportion of the cohort specified by this block.

The CohortDelete function likewise deletes all blocks that have been created in the cohort, freeing all backing store that has been previously allocated for blocks in this cohort.

BlockinfoById and BlockinfoByName functions are used to retrieve information about a block as needed, typically from the corresponding data structures. The BlockinfoById allows the block information to be retrieved using the SAS address of the block. BlockInfoByName allows the block information to be retrieved using the name of the block. These functions would typically return the name, address, size and access control information.

It should be noted that the any type of data can be stored in the shared address space but it is particularly advantages to store persistent data in the form of persistent objects in the shared address space.

In the preferred embodiment the shared persistent virtual storage system 124 works in a client—server manner, with one shared persistent virtual storage system 124 able to service multiple client processes simultaneously. Portions of the SAS addresses space are typically reserved for each client application on a cohort or block basis. As data is created by an application, the application will need to allocate pages via the BlockAllocate function, and create new blocks via BlockCreate as needed. Thus, backing store is allocated only as needed to most efficiently use backing store space.

In the preferred embodiment, the virtual storage manager 208 controls the reservation of shared address space and the allocation of backing store to the shared address space. The virtual storage manager 208 keeps track of the state of the entire shared address space using ordered lists of reserved and free address ranges. When a range of addresses is reserved, this range is removed from the list of free addresses. The appropriate data structure to describe and manage this range of reserved addresses (whether cohort or block) is created and placed on the list of reserved addresses. Additionally, in the preferred embodiment, the "buddy system" is used to keep the address space defragmented. The buddy system is a known method that works by recombining free blocks of storage with other free blocks whenever possible.

When a block of shared address space is needed for a client processes, the client process invokes the BlockCreate function on the virtual storage manager 208. The virtual storage manager 208 locates contiguous free shared address space in the specified cohort. The starting SAS address of the block is returned to the client process. When the client process needs to allocate pages within a block it invokes the BlockAllocate function on the virtual storage manager 208. The virtual storage manager 208 the allocates physical storage in backing store 404. The virtual storage system 208 then returns the starting SAS address for the requested allocation to the client process.

Of course, because the preferred embodiment shared address space is so large, only a portion of the shared address space is typically reserved and allocated to backing store locations at any given time.

It should be noted that the allocation of backing store and the movement of data from backing store to the page cache is transparent to the client process. As far as the client process is concerned, all ALLOCATED pages are always within shared memory. Again pages that are reserved but not yet allocated are not accessible until allocated by BlockAllocate. Thus, programmers do not need to be concerned with where the data resides, whether it be on a local disk or a far off location in the network. Stated another way, the type and arrangement of the backing store is transparent to the client and the movement of data from backing store to real memory page cache is transparent to the client.

In the preferred embodiment of the present invention client processes use the shared persistent virtual storage system 124 to provide a large shared address space in which persistent objects can be stored and saved using single level store semantics. As mentioned above, the preferred embodiment creates a shared address space that uses 128 bit addressing. In order for client processes on commodity 32-bit processors to save and retrieve data using 128 bit address, the preferred embodiment shared persistent virtual storage system provides address translation, paging, and page caching of data in the shared address space so it can be used by client processes.

In general, in the preferred embodiment when a client processes encounters a 128 bit shared address space address, it sends a translation request to the shared persistent virtual storage system. The shared persistent virtual storage system checks to see if the requested data is stored in the page cache. If the data is in page cache, a 32 bit address corresponding to the location of the data in the page cache is returned to the client process. If the data is not in the page cache, the pager retrieves the page of data in which the requested data is located from the backing store in the shared address space, and loads that page into the page cache. The 32 bit address of the data in the page cache can then be returned to the client processes where it can be retrieved using native addressing.

Figure 4:
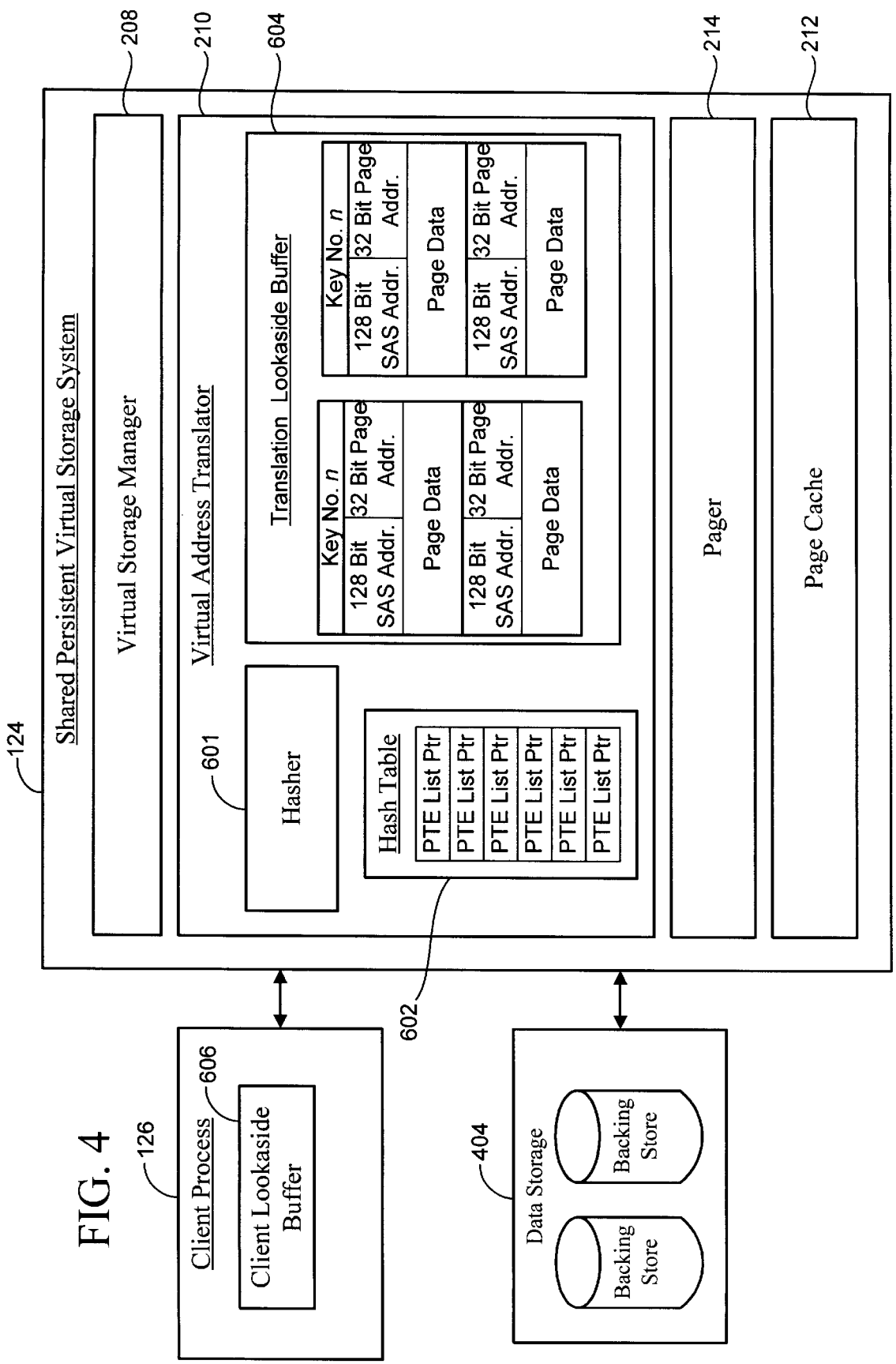
FIG. 4 is a block diagram illustrating the virtual address translator of the preferred embodiment in more detail.

Turning now to FIG. 4, the preferred embodiment shared persistent virtual storage system 124 is illustrated in more detail. In particular, the virtual address translator 210 includes a hasher 601, a hash table 602 and a translator lookaside buffer 604. Hasher 601, hash table 602 and translator lookaside buffer 604 are used to quickly determine if the data corresponding to a requested 128 bit SAS address is currently contained in the page cache 212.

Hashing is a known method for quickly indexing and retrieving data using key numbers. In the preferred embodiment, the hasher 601 takes the 128 bit SAS address and produces a key number n corresponding to that 128 bit addresses using any known hashing technique. The key number n can be used to index data in the hash table 602. In particular, in the preferred embodiment many 128 bit addresses hash to the same key number n. Key numbers can thus be used to quickly reference lists of active addresses translations (contained in page table entries in the translator lookaside buffer 604), with each list corresponding to a one key number n.

The hash table 602 preferably comprises a table containing pointers to lists of page table entries in the lookaside buffer corresponding to that key number n. Thus given the key number n from hasher 601 for a particular 128 bit address, the hash table 602 can provide a pointer to the list of page table entries in the translator lookaside buffer 604 corresponding to that key number n.

The translator lookaside buffer 604 preferably comprises several lists of page table entries, with each list corresponding to a key number n, and each page of data in the page cache having a unique page table entry. Each page table entry includes the SAS address for the corresponding page, the 32 bit page aligned address of the page in the page cache, and other page state data as necessary. This page state data would preferably include a dirty bit to indicate whether the corresponding page in the page cache has been modified such that the changes must be copied back to backing store before the page is removed from the page cache. Additionally, the page state data would preferably include a reference counter that is incremented for each processes using the corresponding page and decremented when a processes is done using page. By keeping track of which processes are using which pages, space in the page cache can be effectively optimized by only keeping pages in the cache which are actively being used. In the preferred embodiment, each page in the page cache comprises 4096 bytes of data.

Thus, in the preferred embodiment, when a client process encounters a SAS address, it passes the SAS address to the virtual address translator. The hasher 601 hashes the SAS address and returns a key number n. The key number n is then used to index a hash table to locate a pointer to the page table entry list in the translator lookaside buffer corresponding to that key number. That relatively short list can then be quickly searched for the desired page table entry and the 32-bit address of the data in the page cache. Thus, the hasher 601, the hash table 602 and the translator lookaside buffer 604, are used to quickly locate which page in the page cache, if any, contains the desired information.

Figure 5:
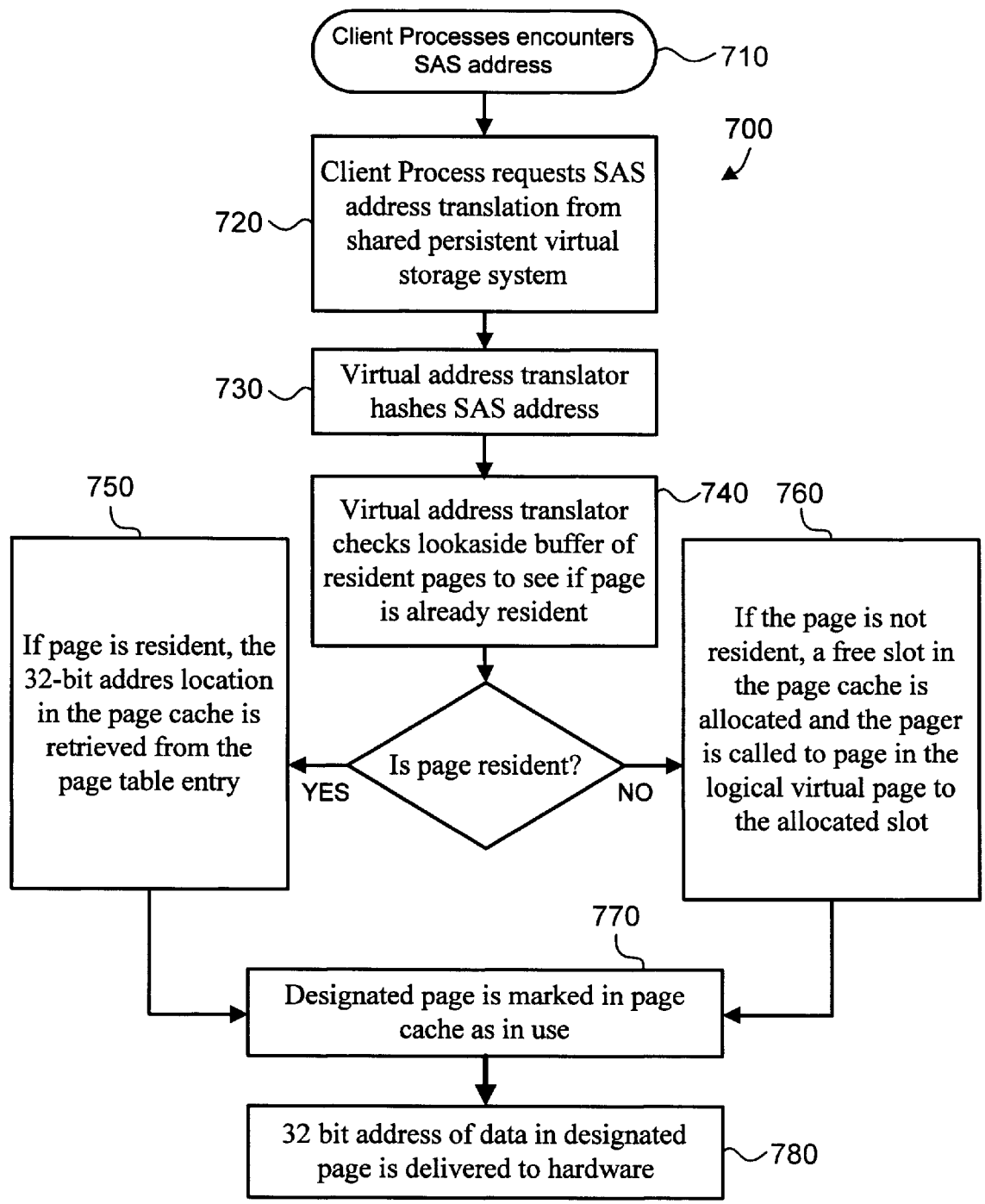
FIG. 5 is a flow diagram of a method for translating addresses in accordance with the preferred embodiment.

Turning to FIG. 5, a method 700 for facilitating access of shared address space data by client processes is illustrated. Method 700 begins in step 710 when a client process encounters a 128 bit SAS address. The client process, because it is suitably running on a commodity 32 bit system, is unable to access the data represented by the 128 bit SAS address directly. To translate the SAS address into an address which can be used by the 32-bit system, the client process contacts the shared persistent virtual storage system to request translation in step 720.

The shared persistent virtual storage system then contacts the virtual address translator to translate the 128 bit SAS address. The next step 730 is for the virtual address translator to hash the page aligned SAS address to a key number n. The key number n is then used as an index into the hash table to locate a pointer to a list of page table entries corresponding to the key number n.

In step 740, the virtual address translator searches the list of page table entries in the translator lookaside buffer corresponding to the key number n. Because many 128 bit addresses map to the same key number, there is likely to be other page table entries in the translator lookaside buffer in each list corresponding to a particular key number. The list of page table entries is then searched to determine which, if any, of the page table entries in that list corresponds to the page of data represented by the top page aligned SAS address.

As previously mentioned with regard to FIG. 4, page cache 212 contains pages sized portions of data copied from data storage as needed by client processes. If a page table entry containing the correct 116 address bits is found, the page is resident in the page cache, and in step 750 the 32 bit address of that page is retrieved from the page table entry.

If a correct page table entry was not found, the page is not resident in the cache and in step 760 it must be brought into the page cache by the pager, and the 32 bit address of the page returned to the client process. In particular, the pager locates a free portion of the page cache, and copies the desired page of data (i.e., the 4096 bytes of data corresponding to the top 116 address bits) from backing storage into the page cache. To locate the needed page of data in backing storage the pager first locates the cohort data structure corresponding to the SAS address. From the cohort data structure a pointer to the block data structure for the block containing the desired page is obtained. From the block data structure the actual location of the page in the backing store can be obtained. For example, the block data structure can include the name of a file containing that block and the offset into that file which contains the desired page. From this, the file system can retrieve the desired page and copy it into the page cache.

A page table entry corresponding to the new page in the cache is then created in the translator lookaside buffer. This new page table entry includes the page aligned SAS address of the data and the 32 bit page aligned native address of the new page in the cache.

In either case, the next step 770 is to mark the page table entry as in use by the client requesting translation of the 128 bit SAS address. By keeping track of which clients are using which pages, space in the page cache can be effectively optimized by only keeping pages in the cache which are actively being used. When a page is unused for a predetermined period of time, the pager copies the updated page data to the backing store and frees that slot in the page cache.

The final step 780 in method 700 is to deliver the 32 bit address of the page in the page cache to the client processes that requested it. From that 32 bit address, the client process can locate the page cache. From this the client process can locate and retrieve the byte of data from the page cache that corresponded to the original 128 bit SAS address. This can be done easily using the last 12 bits of the original SAS address to determine the offset of desired byte in the page cache.

Returning to FIG. 4, to further improve the performance of the preferred embodiment system, a client lookaside buffer 606 can be added to each client process using the SAS address system. These client lookaside buffers 606 would preferably contain copies of the page table entries that it has previously used to translate 128 bit SAS addresses. Thus, the client process when encountering a 128 bit SAS address could first look to its own client lookaside buffer for the page table entry. If the correct entry is there, the 32 bit address of the page can be quickly retrieved from the client lookaside buffer without having to use the virtual address translator 210. If the correct entry is not there, the virtual address translator 210 and the method 700 are used to return the 32 bit page address and a new page table entry to the client lookaside buffer added for this page.

Thus, the preferred embodiment of the present invention provides a shared persistent virtual storage system for addressing data using a large shared address space on commodity systems. This system facilitates the creation, storage and retrieval of persistent objects using SAS addresses that are context independent and can thus be easily shared between different processes. The shared persistent virtual storage system 124 accomplishes this by providing an interface layer between client processes using the SAS addresses and the underlying system. The preferred embodiment does this mapping the shared address space to backing store as needed, and by implicitly moving pages of SAS data between backing storage and main memory as needed by client process. The preferred embodiment then provides a mechanism for translating shared address space addresses into page addresses and providing the page address to the application. Thus, the preferred embodiment provides the ability to store data using proven single level storage techniques in commodity 32-bit systems.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

What is claimed is:

1. An apparatus comprising:
   at least one processor;
   a memory coupled to the at least one processor;
   a computer program residing in the memory, said computer program including a shared persistent storage mechanism, said shared persistent storage mechanism providing a large shared address space for use by application processes on a computer system which uses a relatively smaller native addressing, the shared persistent storage mechanism providing the ability to store persistent objects having context independent pointers stored within the persistent objects as shared address space addresses, the shared persistent storage mechanism including an address translator, the address translator translating shared address space addresses received from the application processes into the relatively smaller native address space address.

2. The apparatus of claim 1 wherein the shared persistent storage mechanism includes a pager and a page cache, said pager bringing pages of data corresponding to the shared address space from backing storage into said page cache as needed.

3. The apparatus of claim 1 wherein the address translator includes a hasher, a hash table and lookaside buffers to facilitate determining if a needed shared address space address is available.

4. The apparatus of claim 2 wherein the address translator includes a hasher, a hash table and a lookaside buffer of page table entries, wherein a page table entry is created for each page in said page cache, each of said page table entries including a native address pointer to a page of shared address space data in said page cache, wherein the hasher hashes shared address space addresses to a key number, and wherein said hash table includes pointers to lists of page table entries in said lookaside buffer corresponding to the key numbers.

5. The apparatus of claim 1 wherein said shared persistent storage mechanism includes a storage manager, said storage manager controlling the reservation of portions of the shared address space for different processes.

6. The apparatus of claim 5 wherein the storage manager allocates backing storage for persistently storing data in the shared address space as needed.

7. The apparatus of claim 1 wherein the shared address space comprises a 128-bit address space.

8. The apparatus of claim 1 wherein the computer system comprises a 32 bit computer system.

9. The apparatus of claim 1 wherein the shared address space is subdivided into cohorts and blocks, and wherein the shared persistent storage mechanism includes a data structure for each reserved cohort and each reserved block, and wherein the data structure for each reserved block includes a file name of a file containing data for the corresponding reserved block in a backing storage.

10. The apparatus of claim 1 wherein the shared persistent virtual storage mechanism facilitates the use of single level store semantics on a 32 bit system such that multiple processes can use context independent addressing.

11. A method for providing a large shared address space on a computer system which uses a relatively smaller addressing, the large shared address space providing the ability to store persistent objects having context independent pointers stored within the persistent objects as shared address space addresses, the method comprising the steps of:
   a) encountering, in a computer process, a pointer within a persistent object stored as a shared address space address;
   b) translating the shared address space address into a native computer system address; and
   c) delivering the native computer system address translation of the shared address space address to the computer process, such that the computer process can use the native address to access an element referenced by the pointer.

12. The method of claim 11 wherein the step of translating the shared address space address comprises checking to determine if a page containing the requested shared address space address is in a page cache.

13. The method of claim 12 further comprising the step of bringing a page of data corresponding to the shared address space address from backing storage to the page cache if the page of data corresponding to the shared address space is not already in the page cache.

14. The method of claim 11 wherein the step of translating the shared address space address comprises hashing the shared address space address to generate a key number, and checking a list of page table entries corresponding to the generated key number.

15. The method of claim 11 wherein the shared address space comprises a 128 bit address space.

16. The method of claim 11 wherein the native computer system address comprises a 32 bit address.

17. The method of claim 11 further comprising the step of removing a page from the page cache that is no longer needed, wherein the step of removing the page from the page cache comprises copying the page in the page cache to backing store if the data in the page has been altered.

18. The method of claim 11 further comprising the step of reserving a portion of the shared address space to the client process when requested by the client process.

19. The method of claim 18 further comprising the step of allocating a portion of backing store to store data for the reserved portion of the shared address space as needed.

20. The method of claim 19 wherein the step of allocating a portion of backing store comprises creating a file in the backing store to store data for the reserved portion of the shared address space.

21. A program product comprising:
(A) a shared persistent storage mechanism, said shared persistent storage mechanism providing a large shared address space for use by application processes on a computer system which uses a relatively smaller addressing, the shared persistent storage mechanism providing the ability to store persistent objects having context independent pointers stored within the persistent objects as shared address space addresses, the shared persistent storage mechanism including an address translator, the address translator translating shared address space addresses received from the application processes into the relatively smaller native address space address; and
(B) signal bearing media bearing said shared persistent storage mechanism.

22. The program product of claim 21 wherein the signal bearing media comprises recordable media.

23. The program product of claim 21 wherein the signal bearing media comprises transmission media.

24. The program product of claim 21 wherein the shared persistent storage mechanism includes a pager and a page cache, said pager bringing pages of data corresponding to the shared address space from backing storage into said page cache as needed.

25. The program product of claim 21 wherein the address translator includes a hasher, a hash table and lookaside buffers to facilitate determining if a needed shared address space address is available.

26. The program product of claim 24 wherein the virtual address translator includes a hasher, a hash table and a lookaside buffer of page table entries, wherein a page table entry is created for each page in said page cache, each of said page table entries including a pointer to a page of shared address space data in said page cache, wherein the hasher hashes shared address space addresses to a key number, and wherein said hash table includes pointers to lists of page table entries in said lookaside buffer corresponding to the key numbers.

27. The program product of claim 21 wherein said shared persistent storage mechanism includes a storage manager, said storage manager controller the reservation of portions of the shared address space for different processes.

28. The program product of claim 27 wherein the storage manager allocates backing storage for persistently storing data in the shared address space as needed.

29. The program product of claim 21 wherein the shared address space comprises a 128-bit address space.

30. The program product of claim 21 wherein the computer system comprises a 32 bit computer system.

31. The program product of claim 21 wherein the shared address space is subdivided into cohorts and blocks, and wherein the shared persistent storage mechanism includes a data structure for each reserved cohort and each reserved block, and wherein the data structure for each reserved block includes a file name of a file containing data for the corresponding reserved block in a backing storage.

32. The program product of claim 21 wherein the shared persistent virtual storage mechanism facilitates the use of single level store semantics on a 32 bit system such that multiple processes can use context independent addressing.

33. An apparatus comprising:
a) at least one processor;
b) a memory coupled to the at least one processor;
c) a shared persistent storage mechanism, said shared persistent storage mechanism providing a large shared address space for use by application processes on a computer system which uses a 32-bit address space, the shared persistent storage mechanism providing the ability to store persistent objects having context independent pointers stored within the persistent objects as shared address space addresses, the shared persistent storage mechanism comprising:
  i) a page cache;
  ii) a pager, said pager bringing pages of data from a backing store to said page cache as needed;
  iii) an addresses translator, said address translator translating shared address space addresses to 32 bit addresses of data in said page cache; and
  iv) a storage manager, said storage manager allocating said shared address space to backing store as needed.

34. The apparatus of claim 33 wherein said address translator includes a plurality of page table entries, wherein a page table entry is created for each page in said page cache, each of said page table entries including a pointer to a page of shared address space data in said page cache.

35. The apparatus of claim 33 wherein the shared address space comprises a 128 bit address space.

36. The apparatus of claim 33 wherein the shared address space is subdivided into a plurality of blocks, and wherein the shared persistent storage mechanism includes a data structure for each reserved block of shared address space, the data structure for each reserved block including a file name of a file containing data for the reserved block in the backing store.

37. The apparatus of claim 33 wherein the storage manager only allocates shared address space to backing store when persistent data is to be stored in said shared address space.

38. The apparatus of claim 33 wherein said address translator includes a hasher, a hash table and a lookaside buffer of page table entries, wherein a page table entry is created for each page in said page cache, each of said page table entries including a pointer to a page of shared address space data in said page cache, and wherein the hasher hashes shared address space addresses to a key number, wherein said hash table includes pointers to lists of page table entries in said lookaside buffer corresponding to the key numbers.

39. The apparatus of claim 35 wherein the shared persistent virtual storage mechanism facilitates the use of single level store semantics on a 32 bit system such that multiple processes can use context independent addressing.

40. The apparatus of claim 39 wherein the shared persistent virtual storage mechanism includes a block create function to reserve a portion of the shared address space and a block allocate function to allocate a portion of a reserved block said backing store.

41. A method for allowing application processes on a computer system using 32 bit addressing to use a single large shared address space, the large shared address space providing the ability to store persistent objects having context independent pointers stored within the persistent objects as shared address space addresses, the method comprising the steps of:
a) requesting translation of a shared address space address when the shared address space address is encountered as a pointer within a persistent object;
b) checking a page cache to determine if a page of shared address space data corresponding to the shared address space address has already been copied into said page cache;
c) bringing a page of data corresponding to the shared address space address from backing storage to the page cache if the page of data corresponding to the shared address space is not already in the page cache; and d) delivering a 32 bit address of the data in the page cache corresponding to the shared address space address to a requesting computer process, such that the requesting computer process can use the 32 bit address to access an element referenced by the pointer.

42. The method of claim 41 wherein the shared address space is a 128 bit address.

43. The method of claim 41 wherein the step of checking a page cache to determine if a page of shared address space data corresponding to the shared address space address has already been copied into said page cache comprises hashing the shared address space address to generate a key number, and checking a list of page table entries corresponding to the generated key number.

44. The method of claim 41 further comprising the step of removing a page from the page cache that is no longer needed, wherein the step of removing the page from the page cache comprises copying the page in the page cache to the backing store if the data in the page has been altered.

45. The method of claim 41 further comprising the step of reserving a portion of the shared address space to the client process when requested by the client process.

46. The method of claim 45 further comprising the step of allocating a portion of backing store to store data for the reserved portion of the shared address space as needed.

47. The method of claim 46 wherein the step of allocating a portion of backing store comprises creating a file in the backing store to store data for the reserved portion of the shared address space.

48. The method of claim 41 wherein the shared address space comprises a 128 bit address space.

49. A program product comprising:

A) a shared persistent storage mechanism, said shared persistent storage mechanism providing a large shared address space for use by application processes on a computer system which uses a 32-bit address space, the shared persistent storage mechanism providing the ability to store persistent objects having context independent pointers stored within the persistent objects as shared address space addresses, the shared persistent storage mechanism comprising:

i) a page cache;

ii) a pager, said pager bringing pages of data from a backing store to said page cache as needed;

iii) an addresses translator, said address translator translating shared address space addresses to 32 bit addresses of data in said page cache; and iv) a storage manager, said storage manager allocating said shared address space to backing store as needed; and B) signal bearing media bearing said shared persistent virtual storage mechanism.

50. The program product of claim 49 wherein the signal bearing media comprises recordable media.

51. The program product of claim 49 wherein the signal bearing media comprises transmission media.

52. The program product of claim 49 wherein said address translator includes a plurality of page table entries, wherein a page table entry is created for each page in said page cache, each of said page table entries including a pointer to a page of shared address space data in said page cache.

53. The program product of claim 49 wherein the shared address space comprises a 128 bit address space.

54. The program product of claim 49 wherein the shared address space is subdivided into a plurality of blocks, and wherein the shared persistent storage mechanism includes a data structure for each reserved block of shared address space, the data structure for each reserved block including a file name of a file containing data for the reserved block in the backing store.

55. The program product of claim 49 wherein die storage manager only allocates shared address space to backing store when persistent data is to be stored in said shared address space.

56. The program product of claim 49 wherein said address translator includes a hasher, a hash table and a lookaside buffer of page table entries, wherein a page table entry is created for each page in said page cache, each of said page table entries including a pointer to a page of shared address space data in said page cache, and wherein the hasher hashes shared address space addresses to a key number, wherein said hash table includes pointers to lists of page table entries in said lookaside buffer corresponding to the key numbers.

57. The program product of claim 49 wherein the shared persistent virtual storage mechanism facilitates the use of single level store semantics on a 32 bit system such that multiple processes can use context independent addressing.

58. The program product of claim 49 wherein the shared persistent virtual storage mechanism includes a block create function to reserve a portion of the shared address space and a block allocate function to allocate a portion of a reserved block said backing store.

* * * * *

UNITED STATES PATENT AND TRADEMARK OFFICE
CERTIFICATE OF CORRECTION

PATENT NO. : 6,298,428 B1
DATED : October 2, 2001
INVENTOR(S) : Steven Jay Munroe; John Gerard Nistler and James W. Stopyro It is certified that error appears in the above-identified patent and that said Letters Patent is hereby corrected as shown below:

Column 17,
Line 26, insert after "the" -- virtual --.

Column 20,
Line 25, replace "die" with -- the --.

Signed and Sealed this

Thirteenth Day of August, 2002

Attest:

JAMES E. ROGAN
Attesting Officer    Director of the United States Patent and Trademark Office